US012786190B2

(12) United States Patent
Barton et al.

(10) Patent No.: US 12,786,190 B2
(45) Date of Patent: Nov. 3, 2026

(54) CONTEXTUAL VALIDATION FOR NETWORK DEVICES

(71) Applicant: Cisco Technology, Inc., San Jose, CA (US)

(72) Inventors: Robert Edgar Barton, Richmond (CA); David John Zacks, Vancouver (CA); Thomas Szigeti, Vancouver (CA); Flemming S Andreasen, Marlboro, NJ (US)

(73) Assignee: Cisco Technology, Inc., San Jose, CA (US)

( * ) Notice: Subject to any disclaimer, the term of this patent is extended or adjusted under 35 U.S.C. 154(b) by 342 days.

(21) Appl. No.: 18/306,700

(22) Filed: Apr. 25, 2023

(65) Prior Publication Data

US 2024/0364687 A1 Oct. 31, 2024

(51) Int. Cl.
*H04L 9/40* (2022.01)

(52) U.S. Cl.
CPC ................................ *H04L 63/0876* (2013.01)

(58) Field of Classification Search
CPC .................................................. H04L 63/0876
See application file for complete search history.

(56) References Cited

U.S. PATENT DOCUMENTS

| | | | | |
|---|---|---|---|---|
| 9,838,259 | B1 * | 12/2017 | Earnhart | H04L 41/0893 |
| 11,444,931 | B1 * | 9/2022 | Quevedo | H04L 63/1458 |
| 11,509,642 | B2 * | 11/2022 | Colon | H04W 4/021 |
| 11,729,142 | B1 * | 8/2023 | Negm | H04L 67/10 709/224 |
| 12,113,815 | B1 * | 10/2024 | Haslam | H04L 63/107 |
| 2013/0173769 | A1 * | 7/2013 | Seastrom | H04L 61/4511 709/223 |
| 2014/0035726 | A1 * | 2/2014 | Schoner | H04W 64/00 340/8.1 |
| 2014/0259147 | A1 * | 9/2014 | L'Heureux | G06F 16/951 726/14 |
| 2016/0337863 | A1 * | 11/2016 | Robinson | H04W 4/021 |
| 2017/0126562 | A1 * | 5/2017 | Dispensa | H04L 63/107 |
| 2017/0180380 | A1 | 6/2017 | Bagasra | |
| 2019/0052658 | A1 | 2/2019 | Clarke | |
| 2019/0098118 | A1 | 3/2019 | Utama | |
| 2019/0334869 | A1 | 10/2019 | Grant | |
| 2020/0186358 | A1 * | 6/2020 | Capola | H04L 9/3228 |

(Continued)

OTHER PUBLICATIONS

J. Damas et al.; Internet Engineering Task Force (IETF), Request for Comments: 6891: Extension Mechanisms for DNS (EDNS (0)); Internet System Consortium Apr. 1, 2013; ISSN: 2070-1721, 16 pages.

*Primary Examiner* — Zhe Liu
(74) *Attorney, Agent, or Firm* — Lee & Hayes, P.C.

(57) ABSTRACT

This disclosure describes techniques for validating a network device based on an operational context of the network device. The techniques may include receiving, via an intercepting node, a DNS query from a querying device. The techniques may include extracting the metadata from the DNS query. Based at least in part on verifying a signature of the metadata, the techniques may include extracting a location code from the metadata. Based at least in part on comparing the location code to an expected location of the intercepting node, the techniques may include sending a response to the querying device indicating a contextual validation of the querying device.

20 Claims, 8 Drawing Sheets

(56) References Cited

U.S. PATENT DOCUMENTS

| | | | | |
|---|---|---|---|---|
| 2020/0334931 | A1* | 10/2020 | Ashok | G07C 9/28 |
| 2021/0029074 | A1* | 1/2021 | Buck | H04L 63/0407 |
| 2021/0218751 | A1* | 7/2021 | Rodriguez Bravo | G06F 21/34 |
| 2021/0234899 | A1* | 7/2021 | Trifilo | H04L 61/4511 |
| 2021/0258720 | A1* | 8/2021 | Wesselius | H04W 4/029 |
| 2021/0281575 | A1* | 9/2021 | Wilson | H04L 63/10 |
| 2022/0210114 | A1 | 6/2022 | Buck | |
| 2022/0377044 | A1* | 11/2022 | Sayko | G06N 20/00 |

* cited by examiner

CONTEXTUAL VALIDATION FOR NETWORK DEVICES

TECHNICAL FIELD

The present disclosure relates generally to validating a network device based on operational context, thereby improving security of the network.

BACKGROUND

Network environments are growing in complexity and scale to handle the ever-increasing demands on computer systems in the modern world. In particular, many industrial, commercial, corporate, and other settings now include a countless array of Internet of Things (IoT) devices. These devices are increasingly networked with the intent of data collection and/or device control. In some settings, such as those relying more and more on automation, operational technology (OT) may interface extensively with information technology (IT), resulting in large, complex IoT networks. The IoT devices in these networks may not be particularly sophisticated computing machines, but they may include equipment such as robots, sensors, programmable logic controllers (PLCs), and other electronics that connect to, receive instruction from, and/or send data across the network. Furthermore, the IoT devices may be produced by different manufacturers, leading to differences in automation and bus systems, different software applications for controlling the IoT devices, and potential compatibility issues. Therefore, settings that include a large amount of IoT devices can lead to administrative challenges in terms of data management, IoT device management, and network security.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

DESCRIPTION OF EXAMPLE EMBODIMENTS

Overview

Figure 1A:
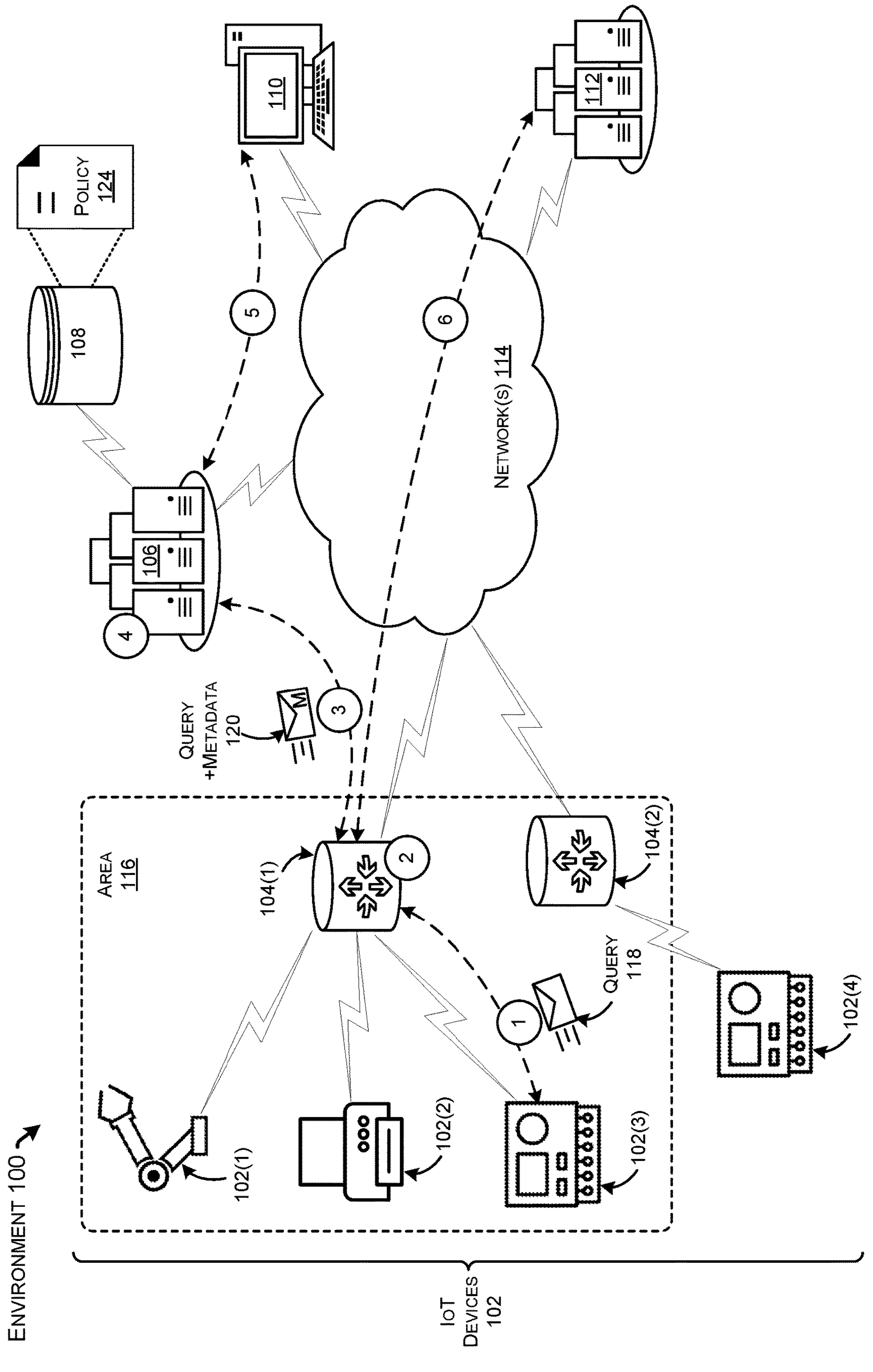
FIGS. 1A and 1B illustrate component diagrams with an example environment in which contextual validation concepts may be employed as part of communications between network devices, in accordance with the present concepts.

This disclosure describes, at least in part, a method that may be implemented by a network device communicatively coupled to an internet of things (IoT) device. The method may include receiving a domain name system (DNS) query from the IoT device in a network. In some examples, the DNS query may be intended for delivery to a DNS service. The method may include verifying the identity of the IoT device. Responsive to verifying the identity of the IoT device, the method may include producing digitally signed metadata. In some examples, the digitally signed metadata may include a location code describing a location of the IoT device. The method may include inserting the digitally signed metadata into the DNS query. The method may further include forwarding the DNS query with the digitally signed metadata to the DNS service.

This disclosure also describes, at least in part, another method that may be implemented by a server device communicatively coupled to a network device, such as an intercepting node. The method may include receiving, via the intercepting node, a domain name system (DNS) query from a querying device. The method may include detecting metadata in the DNS query. The method may include further extracting the metadata from the DNS query. Also, the method may include verifying a signature of the metadata. Based at least in part on verifying the signature, the method may include extracting a location code from the metadata. The method may include comparing the location code to an expected location of the intercepting node. Based at least in part on the comparing, the method may include sending a response to the querying device.

Additionally, the techniques described herein may be performed by a system and/or device having non-transitory computer-readable media storing computer-executable instructions that, when executed by one or more processors, performs the method described above.

EXAMPLE EMBODIMENTS

This disclosure describes techniques for validating a network device based on an operational context of the network device. For example, a network may include one or more Internet of Things (IoT) devices. A manager or operator of an IoT device, or a security service, for instance, may wish to validate the IoT device before applying a policy regarding a communication from the IoT device. In some examples, the manager may be able to validate the IoT device based on information about an operational context of the IoT device. The information about the operational context of the IoT device may be provided to the manager by the network.

Today, industrial IoT devices may be the subject of many possible attack vectors. The attacks may include threats of compromising the security or integrity of an IoT device or associated data. The attacks may be intended to steal data or disrupt production processes. In some scenarios, attacks may include unwanted interventions or changes to the IoT devices. While more sophisticated computing devices may receive protection from easy access or tampering, IoT devices are often located in areas that are less secure. For example, in some corporate data centers or similar controlled spaces, IoT devices may be more easily removed, stolen, or altered without the knowledge of an IoT device operator or manager.

Since IoT devices often perform vital roles in many organizations, being able to verify their integrity can be critical and underappreciated. In some examples, an operational context of an IoT device may be used to verify the integrity and/or security of the IoT device. The operational context may include information such as the logical location of the IoT device in the network, the physical location of the IoT device at the facility, and/or other information regarding location, physicality, identity, status, or attitude of the device, for instance. For instance, the operational context may relate to a security boundary such as an industrial demilitarized zone (IDMZ). The operational context may therefore be a means of validating the identity of the IoT device and/or determining whether it has been compromised in any way before applying a policy regarding data from and/or communication with the IoT device.

Validating an IoT device may be difficult for a manager or security service in part due to the limited computing power, self-awareness, and/or communication capabilities of some IoT devices. Stated another way, an IoT device may not have the capability to know where it is. The disclosed techniques include a way for the network to contribute information regarding an operational context of the IoT device to communications with a manager. For example, the physical infrastructure of the network may add metadata to an eDNS query, providing added assurance to the manager that the lookup is coming from an approved place. The metadata may carry a digital signature which may help assure the manager that the IoT device can be trusted. Another service, such as a domain name system (DNS) resolver (e.g., Umbrella) may then be able to determine whether a query from the IoT device is trusted, by comparing the metadata to predetermined information regarding from where the query should be coming. Therefore, the mechanism for validating the operational context of the IoT device may be viewed as a secure eDNS proxy mechanism, resident in the network and acting on behalf of an eDNS-unaware/eDNS-incapable device, coupled with a cloud-based policy/security service layer.

Such an assurance may be vital in operational technology (OT) and/or industrial settings, where an OT device is required to be at a specific place (e.g., in Purdue/IEC62443 industrial security models), but the assurance may also be useful in many other scenarios. The disclosed techniques may be employed in a wide variety of settings, such as systems involved with supply chain, energy management, lab testing, regulatory data collection, maintenance, productivity management, etc. Furthermore, since the vast majority of extant IoT devices in use today are eDNS-unaware/eDNS-incapable, the present contextual validation techniques may provide an economical way for entities to increase network security, without replacing equipment.

To summarize, network security and/or industrial network architectures may be improved using an efficient technique for wrapping validation capabilities around industrial IoT devices, without having to change the devices themselves. The present disclosure provides for a network-based eDNS proxy mechanism, operating on behalf of downstream IoT devices or similar clients, and serves to provide a secure, verifiable, and simple mechanism by which the physical location of a device and/or other possible parameters may be dynamically inserted into the DNS metadata for that device. The parameters may then be subsequently retrieved and verified by another service operating in the network, such as an IoT management and/or security operations center.

Although the examples described herein may refer to a router or other intercepting node as the point of generation of contextual validation techniques, the techniques can generally be applied to any device in a network. Further, the techniques are generally applicable for any network of devices managed by any entity where virtual resources are provisioned. In some instances, the techniques may be performed by software-defined networking (SDN), and in other examples, various devices may be used in a system to perform the techniques described herein. The devices by which the techniques are performed herein are a matter of implementation, and the techniques described are not limited to any specific architecture or implementation.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1B:
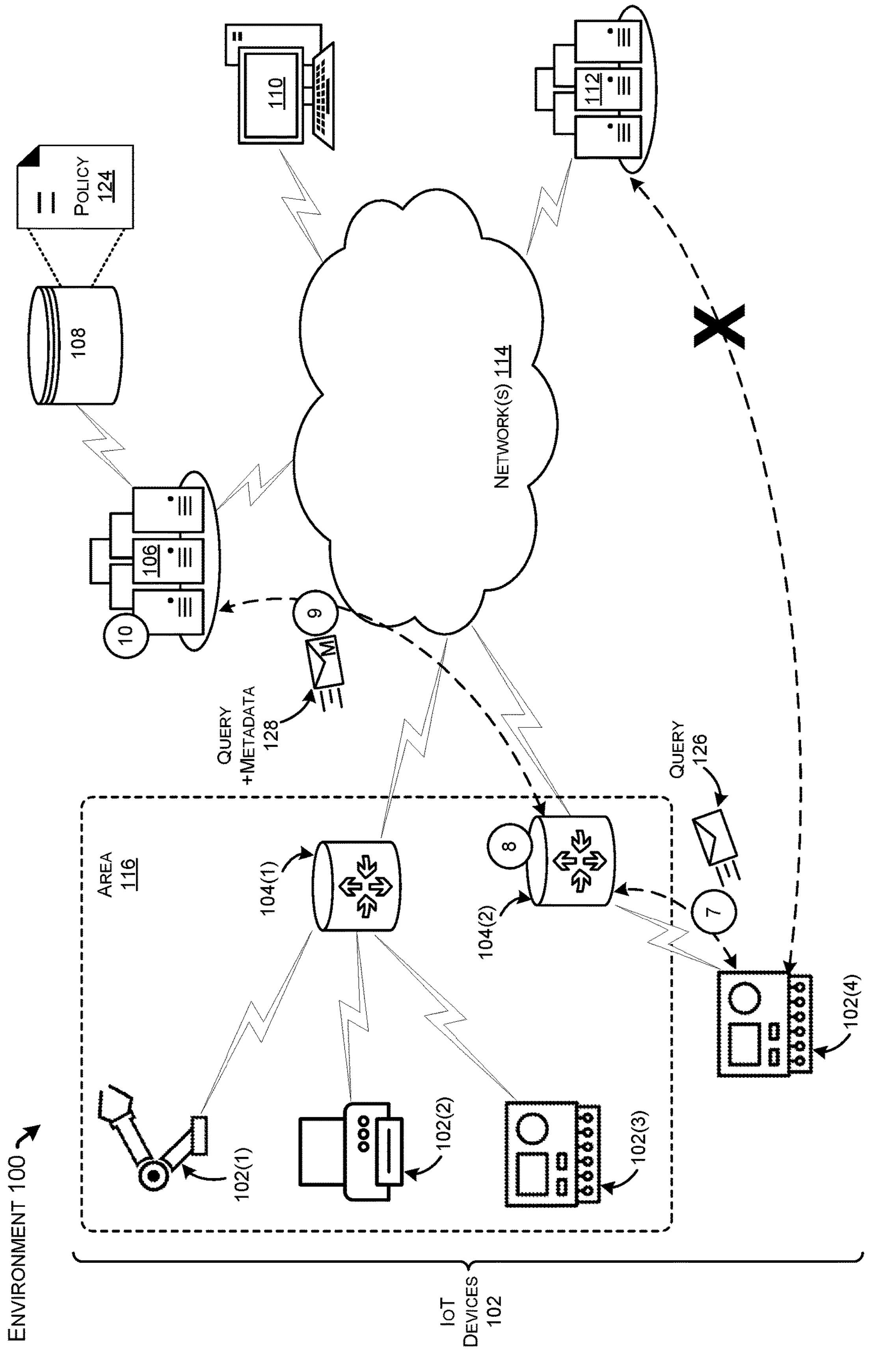

FIGS. 1A and 1B collectively illustrate an example environment 100 in accordance with the present contextual validation concepts. Example environment 100 may include one or more Internet of Things (IoT) devices 102, routers 104, a domain name system (DNS) service 106 (e.g., server device), a database 108, a management device 110, a cloud-computing center 112 (e.g., server(s)), and/or a network 114 (e.g., cloud-computing network, internet). In some cases, parentheticals are utilized after a reference number to distinguish like elements. Use of the reference number without the associated parenthetical is generic to the element. For example, in FIG. 1A, several IoT devices 102 are depicted, including a robot IoT device 102(1), a printer IoT device 102(2), and two programmable logic controller (PLC) IoT devices, 102(3) and 102(4).

Within the example environment 100, the IoT devices 102, routers 104, DNS service 106, database 108, management device 110, cloud-computing center 112, and/or other devices may exchange communications (e.g., packets) via network connection(s) with each other and/or with network 114, indicated by lightning bolts. For instance, network connections may be transport control protocol (TCP) network connections or any network connection (e.g., information-centric networking (ICN)) that enables the routers 104 to exchange packets with other devices via cloud computing network 114. The network connections represent, for example, data paths between the routers 104 and other devices of environment 100. It should be appreciated that the term "network connection" may also be referred to as a "network path." The use of a cloud computing network in this example is not meant to be limiting. Other types of networks are contemplated in accordance with reusable acknowledgment concepts.

In some scenarios, example environment 100 may be subdivided into areas or locations. For instance, some devices of example environment 100 may be associated with area 116 (shown as a dashed-line box), while other devices are not associated with area 116. As shown in FIG. 1A, IoT devices 102(1), 102(2), and 102(3) and routers 104(1) and 104(2) are considered to be included in area 116, while IoT device 102(4) is not part of area 116. In some examples, area 116 may represent a geographical boundary (e.g., geofence).

In other examples, area 116 may represent a security boundary related to a logical connection. Area 116 may represent an industrial demilitarized zone (IDMZ), for instance. A location of IoT devices 102(1), 102(2), and 102(3) may be viewed in terms of having a logical connection "behind" router 104(1) with respect to "outside" areas of the network, such as areas accessible via network 114. Stated another way, all of IoT devices 102 and routers 104 may be on-premise at a particular geographic location, while IoT device 102(4) is logically located outside of area 116, and may be viewed as potentially unsecured.

FIGS. 1A and 1B show several examples of communications between the IoT devices 102, routers 104, DNS service 106, management device 110, cloud-computing center 112, and various other network devices. The communications are indicated with dashed, numbered lines. For instance, an example contextual validation scenario that includes Steps 1-6 is depicted in FIG. 1A.

At "Step 1" of FIG. 1A, IoT device 102(3) may send a query 118 to router 104(1). In some scenarios, query 118 may be a DNS request for data from DNS service 106. For instance, IoT device 102(3) may represent an eDNS-unaware IoT device (in this example, a Programmable Logic Controller (PLC)). IoT device 102(3) may be configured to use a DNS service for name resolution. In some examples, the DNS service may be a cloud-based DNS service.

At "Step 2" of FIG. 1A, router 104 may receive query 118 from IoT device 102(3). Stated another way, router 104(1) may be an intercepting node along the route of query 118. For instance, router 104(1) may be a first-hop switch, router, or security device within the network path between IoT device 102(3) and the DNS service 106. Router 104(1) may be configured to intercept at least some packets or types of packets. In some examples, router 104(1) may be configured with an eDNS proxy mechanism for intercepting DNS requests. Rather than simply forwarding query 118 onward to resolver 106, router 104(1) may perform one or more functions upon receiving query 118. For example, router 104(1) may attempt to verify an identity and/or other information regarding IoT device 102(3). Router 104(1) may also add metadata to query 118 before forwarding.

In some examples, router 104(1) (e.g., the intercepting node) may be aware of at least one or more of the registered IoT devices 102 within its domain, such as within area 116. Router 104(1) may have been informed of the IoT devices 102 previously by a network, security, and/or IoT operations console/service. As such, router 104(1) may be able to verify an identity (e.g., media access control (MAC) address, manufacturer usage description (MUD) check, etc.) of IoT device 102(3). Once verified, router 104(1) may insert metadata into the DNS query 118. In FIG. 1A, query+metadata 120 represents the original DNS query 118 with the added metadata (represented by an "M"). The metadata may be a sequence of eDNS options (OPT) record, for instance. The metadata may comprise any of a wide variety of types of information, such as one or more of the following examples. Metadata may include a flag to indicate metadata presence in the query. Metadata may include type-length-value (TLV) information to indicate type and/or length of the metadata. A (potentially) unique identifier of router 104(1) (e.g., MAC, internet protocol (IP), or other identifier as arranged by the relevant organization) may be included. A location code of router 104(1) (as arranged by the organization and/or enterprise) may be included. The location code may further indicate a position of IoT device 102(3), logically and/or geographically, relative to router 104(1). For instance, the metadata may indicate that IoT device 102(3) is within area 116 and/or that IoT device 102(3) is logically located on a secure side of (behind) router 104(1) with respect to an unsecure portion of the network. The examples for metadata listed here are not meant to be limiting, a wide variety of information is contemplated for inclusion as metadata.

Furthermore, router 104(1) may produce a digital signature for the metadata, resulting in digitally signed metadata. The digital signature may provide for verification and/or to avoid metadata tampering. The digital signature may be based on a pre-configured and/or revocable certificate installed within router 104(1), for instance, and may be under control of a relevant organization. Furthermore, the digital signature may be encoded or otherwise protected.

At "Step 3" of FIG. 1A, router 104(1) may forward query+metadata 120 to DNS service 106. Note that in this scenario, the updated DNS query, containing the digitally signed metadata, is now being relayed beyond area 116 to the DNS service. In some examples, query+metadata 120 may therefore pass through a DMZ or IDMZ layer (the border of area 116, for instance), in order to access the DNS service. However, it is anticipated that most firewalls and other security devices may pass along the eDNS-metadata-laden query, as per RFC 6891, in examples where the eDNS-metadata-laden query does not exceed maximum transmission units (MTUs) or similar restrictions along the path.

At "Step 4" of FIG. 1A, upon reception of the query+metadata 120 at DNS service 106, the presence of the eDNS metadata may be noted. For instance, DNS service 106 may recognize a flag in query+metadata 120 notifying DNS service 106 of the presence of the metadata. DNS service 106 may strip the metadata from the query for use, or otherwise access and/or read the metadata. For example, DNS service 106 may verify the metadata for integrity. Verification may include examining the digital signature of the metadata. In an instance where the metadata is found to have been tampered with, the metadata and/or the query may be discarded. In an instance where the metadata is verified, the metadata may then be inspected to extract further information. For instance, a location code and/or intercepting device information may be examined. Information about router 104(1) may be compared to predetermined data, which may be provided by the enterprise involved, in some cases. The predetermined data may indicate an expected location and/or a particular intercepting device that IoT device 102(3) or another IoT device is expected to be located behind.

In an instance where the received and examined metadata matches the predetermined data, the IoT device 102(3), the router 104(1), the particular query, and/or the situation in general may be viewed as approved, or contextually validated. Upon validation, a DNS response may be sent back from the DNS service 106 to IoT device 102(3) (e.g., the querying device). For instance, DNS service 106 may access policy 124 at database 108. DNS service 106 may determine that policy 124 applies to the DNS query+metadata 120. Policy 124 may inform or control the response to the query, in some cases. Therefore the original query 118 of IoT device 102(3) may be satisfied.

In some examples, such as for simplicity of operation, and/or to allow for easy device movement in case of migrations or when devices are mobile, more than one possible location for a given IoT device 102 may be encoded into the DNS system. Such location metadata may be updated, revised, and/or removed at any time, at the sole discretion of the enterprise involved.

Furthermore, it may be possible for router 104(1), or any intercepting node, to encode additional metadata (in addition to location) into the embedded eDNS metadata stream. For example, this could include (but is not limited to) time-of-day data for the observation, forensics of a traffic profile of an IoT device 102, rate and/or frequency of DNS queries of an IoT device 102, off-net vs. on-net DNS queries in use, etc. Such metadata may be coupled with corresponding enterprise policies to query the metadata in order to effect a policy response. Additionally or alternatively, the metadata may be provided simply for additional visibility into operations of IoT device(s) 102, such as for baselining and/or spotting deviations from baselined profile behavior.

At "Step 5" of FIG. 1A, upon validating query+metadata 120, the IoT device 102(3), and/or router 104(1), in some examples, DNS service 106 may communicate with management device 110. For instance, management device 110 may be used by a manager or administrator of an organization that oversees area 116 and/or at least some of IoT devices 102. DNS service 106 may inform management device 110 that the received and examined metadata of DNS query+metadata 120 was found to match the predetermined data. DNS service 106 may inform management device 110 that the DNS response was sent back from the DNS service 106 to IoT device 102(3). In other examples, database 108 and/or policy 124 may be accessed by management device 110. For instance, DNS service 106 may inform management device 110 that IoT device 102(3) and/or router 104(1) was validated, and the management device 110 may move forward with identifying a relevant policy to apply to potential communications between IoT device 102(3) and other devices of the network.

At "Step 6" of FIG. 1A, IoT device 102(3) may be allowed to communicate with cloud-computing center 112 via router 104(1). For instance, the DNS response that was sent back from the DNS service 106 to IoT device 102(3) may allow the IoT device 102(3) to communicate with cloud-computing center 112. In some examples, cloud-computing center 112 may represent a Machine as a Service (MaaS) datacenter. In this scenario, the contextual validation concepts may be employed as part of a MaaS solution set, using connectivity with industrial IoT devices 102 to deliver information about real-time system and/or device operations. Therefore, contextual validation concepts may allow the enterprise to meet business-wide goals for IoT device security in a flexible and operationally simple manner.

FIG. 1B depicts a second example contextual validation scenario. Some aspects of the scenario shown in FIG. 1B may be similar to aspects of the examples described above relative to FIG. 1A. Therefore, for sake of brevity, not all elements of FIG. 1B will be described in detail. In the scenario shown in FIG. 1B, IoT device 102(4) sends a query 126 to router 104(2). As noted above, IoT device 102(4) is outside of area 116.

At "Step 7" of FIG. 1B, IoT device 102(4) may send a query 126 to router 104(2).

At "Step 8" of FIG. 1B, router 104(2) may receive query 126 from IoT device 102(4). Similar to router 104(1), router 104(2) may be configured with an eDNS proxy mechanism for intercepting DNS requests. Router 104(2) may attempt to verify an identity and/or other information regarding IoT device 102(4). Router 104(2) may also add metadata to query 126 before forwarding query 126 to DNS service 106.

At "Step 9" of FIG. 1A, router 104(2) may forward query+metadata 128 to DNS service 106.

At "Step 10" of FIG. 1A, upon reception of the query+metadata 128 at DNS service 106, the presence of the eDNS metadata may be noted. However, in this scenario, the received and examined metadata may not match the predetermined data. For instance, DNS service 106 may expect that IoT device 102(4) is located within area 116, but the query+metadata 128 may include a location code that indicates IoT device 102(4) is positioned outside of area 116. A mismatch between the observed/indicated and expected location of IoT device 102(4) may indicate that IoT device 102(4) has been moved, stolen, and/or otherwise physically compromised. Upon discovering the mismatch, the scenario depicted in FIG. 1B may proceed with a variety of possible next steps. For example, various policy actions may be initiated. In some examples, DNS service 106 may access a policy 124 at database 108 to determine a course of action. For instance, the enterprise involved that contracted with the DNS service 106 may have outlined one or more courses of action in policy 124 for scenarios in which a IoT device 102 did not pass validation. In other examples, DNS service 106 may communicate with management device 110 to determine a course of action. Example courses of action are described below.

The following examples include potential courses of action for responding to a mismatch between an observed and expected location of an IoT device 102. Stated another way, if an IoT device 102 is unable to be contextually validated, the following responses may be used. In some examples, DNS service 106 may provide no DNS response issued to the IoT device 102. This action may have the effect of stopping device/service operation due to lack of name resolution. In other examples, DNS service 106 may raise an alert or otherwise communicate with management device 110 (e.g., with the enterprise's IoT/security operations console). For instance, DNS service 106 may warn management device 110 that the IoT device 102 may have been moved and/or compromised. In other examples, DNS service 106 may provide a DNS response to the querying IoT device 102, potentially containing signed metadata indicating a possible compromise, allowing for device-specific remediations to be implemented. For instance, if the IoT device 102 is suspected to have been moved, a response from the DNS service 106 to the IoT device 102 with DNS signed metadata indicating the suspected move may cause the IoT device 102 to brick and/or shut down to avoid operation within an unknown network physical or logical space. In reference to the scenario in FIG. 1B, IoT device 102(4) may prevented from communicated with cloud-computing center 112 (indicated with an "X") or with other network devices, for instance. Other possible policy actions, which may be prescribed by the enterprise, are contemplated, such as: IoT device 102 quarantine, traffic redirection into an intrusion prevention system (IPS), traffic copy from IoT device 102 for forensic analysis, etc. Such policy actions may be initiated at a router 104 (e.g., the intercepting node), or at any other network node or device (physical or virtual) which may be under control by the enterprise involved.

To summarize, the contextual validation techniques described herein may improve network security. The techniques may be employed with a simple eDNS proxy operating on intercepting nodes in a network. As such, the techniques are relatively lightweight, featuring low computational cost and/or low bandwidth usage. Therefore, contextual validation concepts may allow the enterprise to meet business-wide goals for IoT device security in a flexible and operationally simple manner.

Figure 2:
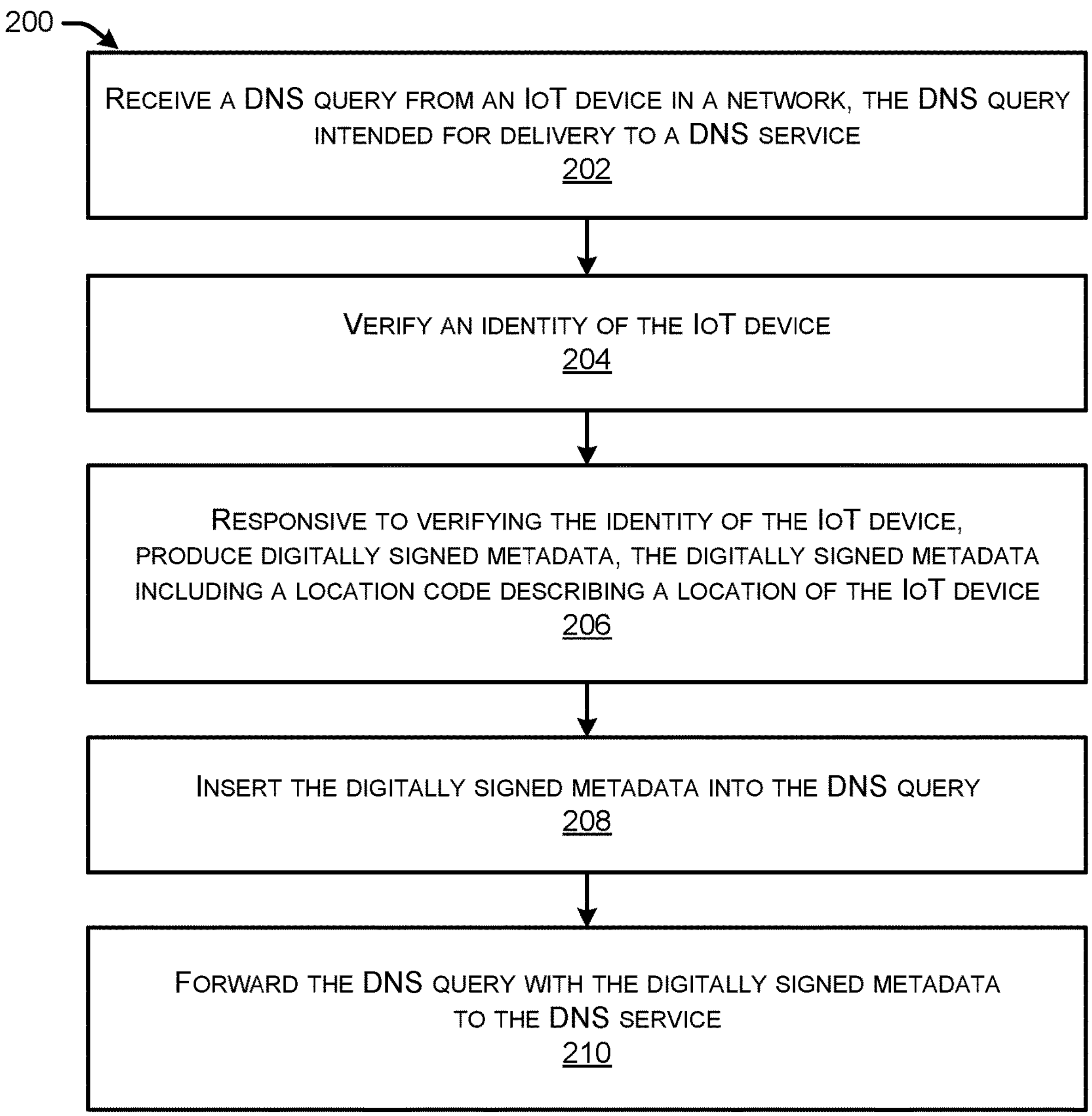
FIGS. 2 and 3 illustrate flow diagrams of example methods for the use of contextual validation as a part of communications among network devices, in accordance with the present concepts.
Figure 3:
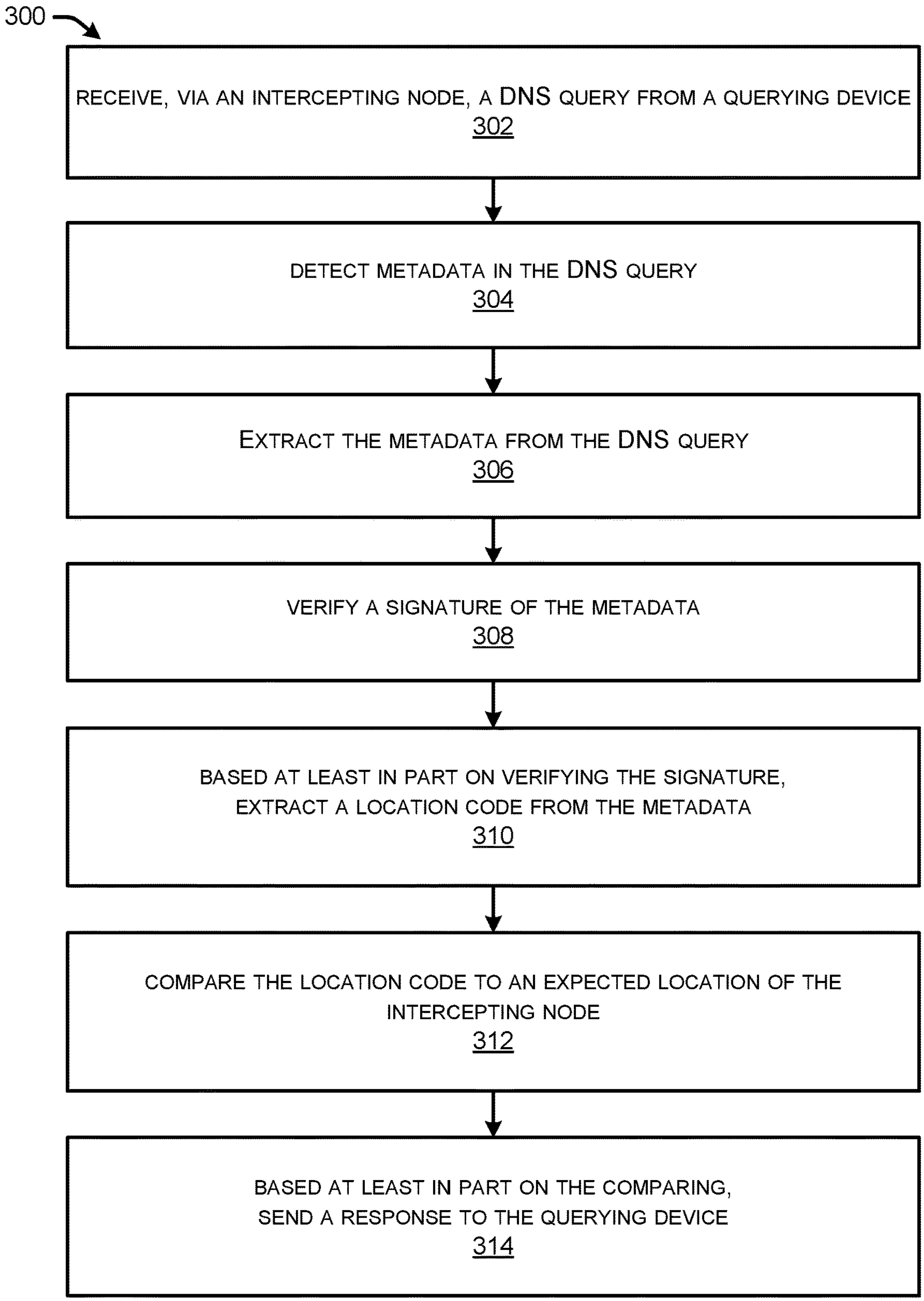

FIGS. 2 and 3 illustrate flow diagrams of example methods 200 and 300 that include functions that may be performed at least partly by a network device, such as router 104 or at a DNS service 106 described relative to FIGS. 1A and 1B. The logical operations described herein with respect to FIGS. 2 and 3 may be implemented (1) as a sequence of computer-implemented acts or program modules running on a computing system and/or (2) as interconnected machine logic circuits or circuit modules within the computing system.

The implementation of the various devices and/or components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations might be performed than shown in the FIGS. 2 and 3 and described herein. These operations may also be performed in parallel, or in a different order than those described herein. Some or all of these operations may also be performed by components other than those specifically identified. Although the techniques described in this disclosure is with reference to specific devices, in other examples, the techniques may be implemented by less devices, more devices, different devices, or any configuration of devices and/or components.

FIG. 2 illustrates a flow diagram of an example method 200 for network devices to perform contextual validation techniques. Method 200 may be performed by a router (e.g., router 104) communicatively coupled to an IoT device (e.g., IoT device 102), for instance. In some examples, method 200 may be performed by a computing device comprising one or more processors and one or more non-transitory computer-readable media storing computer-executable instructions that, when executed by the one or more processors, cause the one or more processors to perform method 200.

At 202, method 200 may include receiving a domain name system (DNS) query from an Internet-of-Things (IoT) device in a network. The DNS query may be intended for delivery to a DNS service. For instance, the DNS service may be a cloud-based DNS service. In some examples, the IoT device may be eDNS unaware. The method may be performed by a switch, router, or security device of the network. A router may be configured with an eDNS proxy mechanism for intercepting DNS queries, in some cases.

At 204, method 200 may include verifying an identity of the IoT device. Verifying the identity may be based on whether the IoT device is a device known or assigned to the router, for instance.

At 206, responsive to verifying the identity of the IoT device, method 200 may include producing digitally signed metadata. In some examples, the digitally signed metadata may include a location code describing a location of the IoT device. For example, the location of the IoT device may refer to a logical location of the IoT device in the network. The logical location may include information regarding positioning of the IoT device relative to a security barrier and/or relative to the router, for instance.

At 208, method 200 may include inserting the digitally signed metadata into the DNS query. In some examples, the digitally signed metadata may include a flag indicating the presence of the digitally signed metadata to alert a downstream device to the presence of the metadata.

At 210, method 200 may include forwarding the DNS query with the digitally signed metadata to the DNS service.

FIG. 3 illustrates a flow diagram of an example method 300 for network devices to perform contextual validation techniques. Method 300 may be performed by a server device (e.g., DNS service 106) communicatively coupled to an intercepting device (e.g., router 104), for instance. In some examples, method 300 may be performed by a computing device comprising one or more processors and one or more non-transitory computer-readable media storing computer-executable instructions that, when executed by the one or more processors, cause the one or more processors to perform method 300.

At 302, method 300 may include receiving, via an intercepting node, a domain name system (DNS) query from a querying device. For instance, the querying device may be an IoT device that is positioned on a secure side, behind the intercepting node in a network.

At 304, method 300 may include detecting metadata in the DNS query. For example, the method may include detecting a flag in the DNS query, and the flag may indicate a presence of metadata in the DNS query.

At 306, method 300 may include extracting the metadata from the DNS query. The metadata may be extracted from the DNS query at least partly in response to detecting the flag, in some cases.

At 308, method 300 may include verifying a signature of the metadata, such as checking a certificate associated with the signature.

At 310, based at least in part on verifying the signature, method 300 may include extracting a location code from the metadata. In some examples, the location code may refer to a logical location of the querying device relative to the intercepting node. For instance, the location code may indicates that the logical location of the querying device is in a logically secure position.

At 312, method 300 may include comparing the location code to an expected location of the intercepting node. Method 300 may further include determining, via the comparing, that the location code either does or does not match the expected location of the IoT device.

At 314, based at least in part on the comparing, method 300 may include sending a response to the querying device. In an instance where the location code matches the expected location, the response may indicate that the DNS query is verified. In an instance where the location code does not match the expected location, the response may include instructions for the querying device to shut down as a security precaution. In some examples, responsive to determining that the location code does not match the expected location, the method may include sending a message indicating a failed contextual validation to a management device, such a console of an operations manager for the relevant organization.

Figure 4:
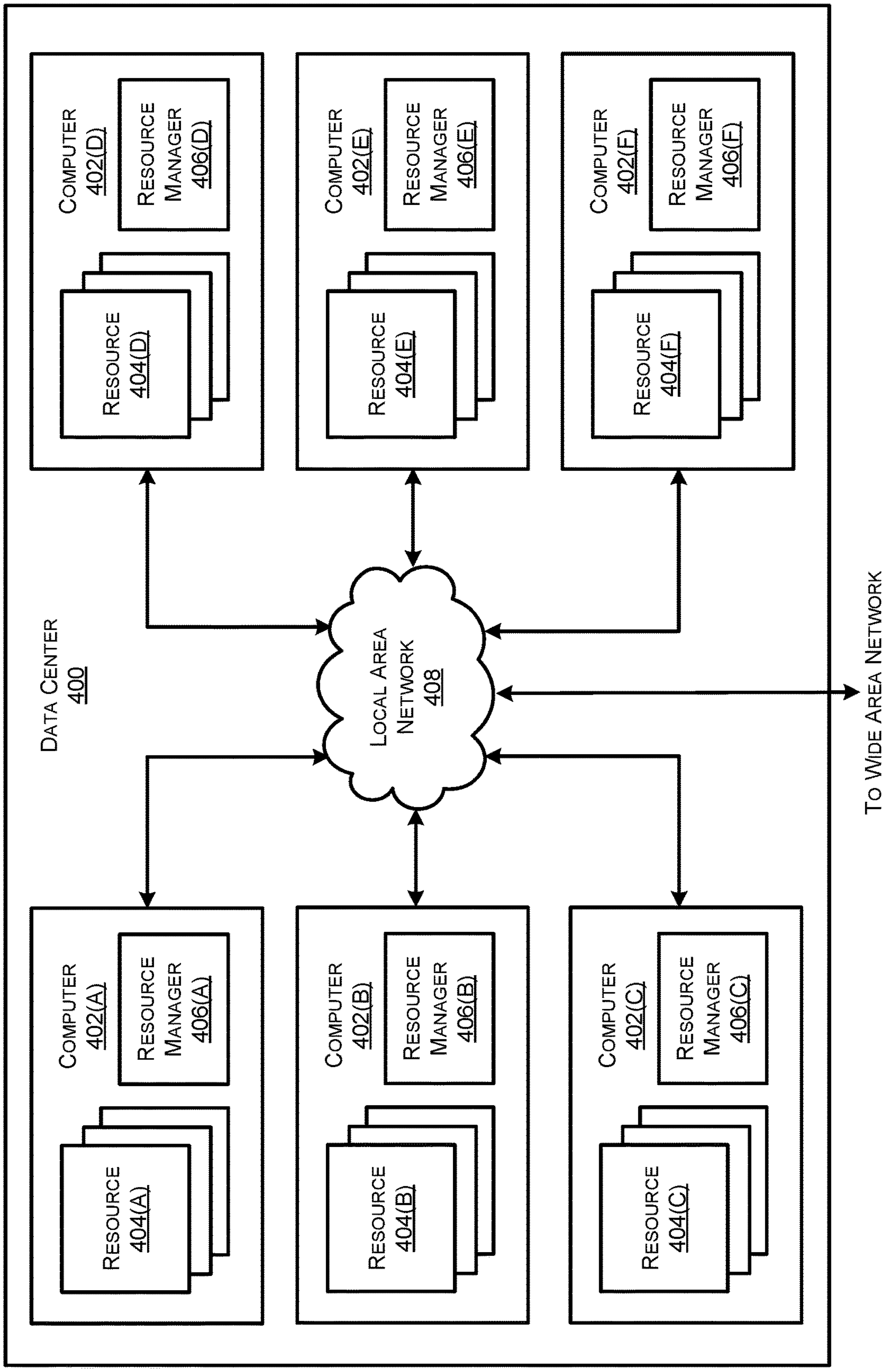
FIG. 4 illustrates a computing system diagram illustrating a configuration for a data center that can be utilized to implement aspects of the technologies disclosed herein.

FIG. 4 is a computing system diagram illustrating a configuration for a data center 400 that can be utilized to implement aspects of the technologies disclosed herein. The example data center 400 shown in FIG. 4 includes several computers 402A-402F (which might be referred to herein singularly as "a computer 402" or in the plural as "the computers 402") for providing computing resources. In some examples, the resources and/or computers 402 may include, or correspond to, any type of networked device described herein, such as a router 104 and/or DNS service 106 (e.g., server device). Although, computers 402 may comprise any type of networked device, such as servers, switches, routers, hubs, bridges, gateways, modems, repeaters, access points, hosts, etc.

The computers 402 can be standard tower, rack-mount, or blade server computers configured appropriately for providing computing resources. In some examples, the computers 402 may provide computing resources 404 including data processing resources such as virtual machine (VM) instances or hardware computing systems, database clusters, computing clusters, storage clusters, data storage resources, database resources, networking resources, and others. Some of the computers 402 can also be configured to execute a resource manager 406 capable of instantiating and/or managing the computing resources. In the case of VM instances, for example, the resource manager 406 can be a hypervisor or another type of program configured to enable the execution of multiple VM instances on a single computer 402. Computers 402 in the data center 400 can also be configured to provide network services and other types of services.

In the example data center 400 shown in FIG. 4, an appropriate local area network (LAN) 408 is also utilized to interconnect the computers 402A-402F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 400, between each of the computers 402A-402F in each data center 400, and, potentially, between computing resources in each of the computers 402. It should be appreciated that the configuration of the data center 400 described with reference to FIG. 4 is merely illustrative and that other implementations can be utilized.

In some examples, the computers 402 may each execute one or more application containers and/or virtual machines to perform techniques described herein. For instance, the containers and/or virtual machines may serve as server devices, user devices, and/or routers in the DNS service 106 and/or the cloud-computing center 112.

In some instances, the data center 400 may provide computing resources, like application containers, VM instances, and storage, on a permanent or an as-needed basis. Among other types of functionality, the computing resources provided by a cloud computing network may be utilized to implement the various services and techniques described above. The computing resources 404 provided by the cloud computing network can include various types of computing resources, such as data processing resources like application containers and VM instances, data storage resources, networking resources, data communication resources, network services, and the like.

Each type of computing resource 404 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 404 not mentioned specifically herein.

The computing resources 404 provided by a cloud computing network may be enabled in one embodiment by one or more data centers 400 (which might be referred to herein singularly as "a data center 400" or in the plural as "the data centers 400"). The data centers 400 are facilities utilized to house and operate computer systems and associated components. The data centers 400 typically include redundant and backup power, communications, cooling, and security systems. The data centers 400 can also be located in geographically disparate locations. One illustrative embodiment for a data center 400 that can be utilized to implement the technologies disclosed herein will be described below with regards to FIG. 5.

Figure 5:
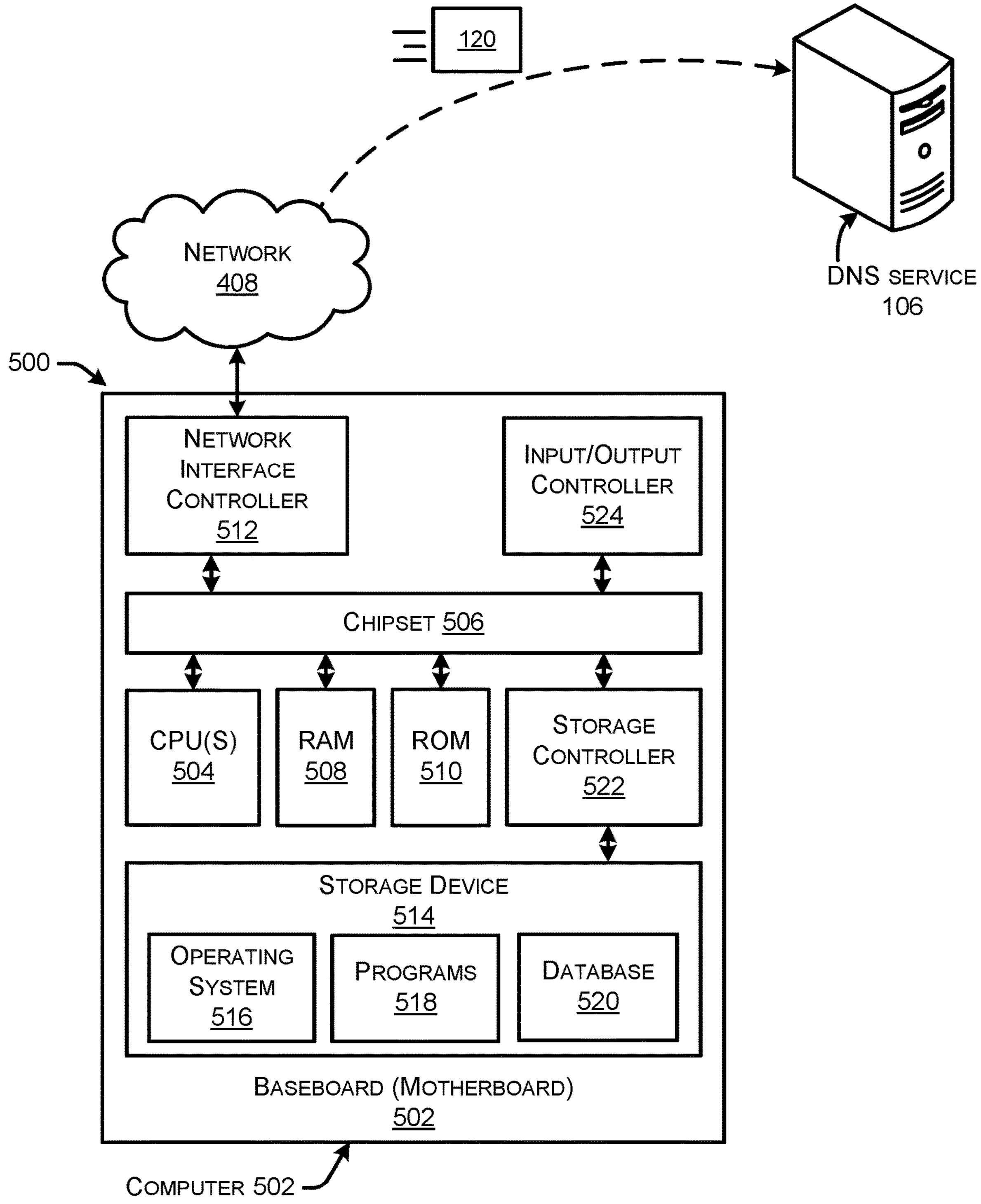
FIG. 5 is a computer architecture diagram showing an illustrative computer hardware architecture for implementing a device that can be utilized to implement aspects of the various technologies presented herein.

FIG. 5 shows an example computer architecture 500 for a computer 402 capable of executing program components for implementing the functionality described above. The computer architecture 500 shown in FIG. 5 illustrates a conventional server computer, workstation, desktop computer, laptop, tablet, network appliance, e-reader, smartphone, and/or other computing device, and can be utilized to execute any of the software components presented herein. The computer 402 may, in some examples, correspond to a physical device described herein (e.g., server device, router, etc.), and may comprise networked devices such as servers, switches, routers, hubs, bridges, gateways, modems, repeaters, access points, etc. For instance, computer 402 may correspond to router 104 and/or a device at DNS service 106.

As shown in FIG. 5, the computer 402 includes a baseboard 502, or "motherboard." which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 402.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 402. The chipset 506 can further provide an interface to a computer-readable storage medium such as a read-only memory ("ROM") 510 or non-volatile RAM ("NVRAM") for storing basic routines that help to startup the computer 402 and to transfer information between the various components and devices. The ROM 510 or NVRAM can also store other software components necessary for the operation of the computer 402 in accordance with the configurations described herein.

The computer 402 can operate in a networked environment using logical connections to remote computing devices and computer systems through a network, such as the networks 114 and/or 408. The chipset 506 can include functionality for providing network connectivity through a network interface controller (NIC) 512, such as a gigabit Ethernet adapter. The NIC 512 is capable of connecting the computer 402 to other computing devices over the network 408. For instance, in the example shown in FIG. 5, NIC 512 may help facilitate transfer of data, packets, queries, and/or communications, over the network 408 with DNS service 106. It should be appreciated that multiple NICs 512 can be present in the computer 402, connecting the computer to other types of networks and remote computer systems.

The computer 402 can be connected to a storage device 514 that provides non-volatile storage for the computer. The storage device 514 can store an operating system 516, programs 518, database 520, and/or other data. The storage device 514 can be connected to the computer 402 through a storage controller 522 connected to the chipset 506, for example. The storage device 514 can consist of one or more physical storage units. The storage controller 522 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 402 can store data on the storage device 514 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 514 is characterized as primary or secondary storage, and the like.

For example, the computer 402 can store information to the storage device 514 by issuing instructions through the storage controller 522 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 402 can further read information from the storage device 514 by detecting the physical states or characteristics of one or more particular locations within the physical storage units.

In addition to the mass storage device 514 described above, the computer 402 can have access to other computer-readable storage media to store and retrieve information, such as policies, program modules, data structures, and/or other data. It should be appreciated by those skilled in the art that computer-readable storage media is any available media that provides for the non-transitory storage of data and that can be accessed by the computer 402. In some examples, the operations performed by the network 408, and or any components included therein, may be supported by one or more devices similar to computer 402. Stated otherwise, some or all of the operations performed by the network 408, and or any components included therein, may be performed by one or more computer devices 402 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"). BLU-RAY, ternary content addressable memory (TCAM), and/or other optical storage, magnetic cassettes, magnetic tape, magnetic disk storage or other magnetic storage devices, or any other medium that can be used to store the desired information in a non-transitory fashion.

As mentioned briefly above, the storage device 514 can store an operating system 516 utilized to control the operation of the computer 402. According to one embodiment, the operating system comprises the LINUX operating system. According to another embodiment, the operating system comprises the WINDOWS® SERVER operating system from MICROSOFT Corporation of Redmond. Washington. According to further embodiments, the operating system can comprise the UNIX operating system or one of its variants. It should be appreciated that other operating systems can also be utilized. The storage device 514 can store other system or application programs and data utilized by the computer 402.

In one embodiment, the storage device 514 or other computer-readable storage media is encoded with computer-executable instructions which, when loaded into the computer 402, transform the computer from a general-purpose computing system into a special-purpose computer capable of implementing the embodiments described herein. These computer-executable instructions transform the computer 402 by specifying how the CPUs 504 transition between states, as described above. According to one embodiment, the computer 402 has access to computer-readable storage media storing computer-executable instructions which, when executed by the computer 402, perform the various processes described above with regards to FIGS. 1A-3. The computer 402 can also include computer-readable storage media having instructions stored thereupon for performing any of the other computer-implemented operations described herein.

The computer 402 can also include one or more input/output controllers 524 for receiving and processing input from a number of input devices, such as a keyboard, a mouse, a touchpad, a touch screen, an electronic stylus, or other type of input device. Similarly, an input/output controller 524 can provide output to a display, such as a computer monitor, a flat-panel display, a digital projector, a printer, or other type of output device. It will be appreciated that the computer 402 might not include all of the components shown in FIG. 5, can include other components that are not explicitly shown in FIG. 5, or might utilize an architecture completely different than that shown in FIG. 5.

As described herein, the computer 402 may comprise one or more devices, such as a router 104 or a server device of DNS service 106, and/or other devices. The computer 402 may include one or more hardware processors 504 (processors) configured to execute one or more stored instructions. The processor(s) 504 may comprise one or more cores. Further, the computer 402 may include one or more network interfaces configured to provide communications between the computer 402 and other devices, such as the communications described herein as being performed by router(s) 104 and DNS service 106, and/or other devices. In some examples, the communications may include data, packet, query, response, and/or other information transfer, for instance. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 518 may comprise any type of programs or processes to perform the techniques described in this disclosure in accordance with contextual validation techniques. For instance, the programs 518 may cause the computer 402 to perform techniques for communicating with other devices using any type of protocol or standard usable for determining connectivity. Additionally, the programs 518 may comprise instructions that cause the computer 402 to perform the specific techniques for contextual validation.

Figure 6:
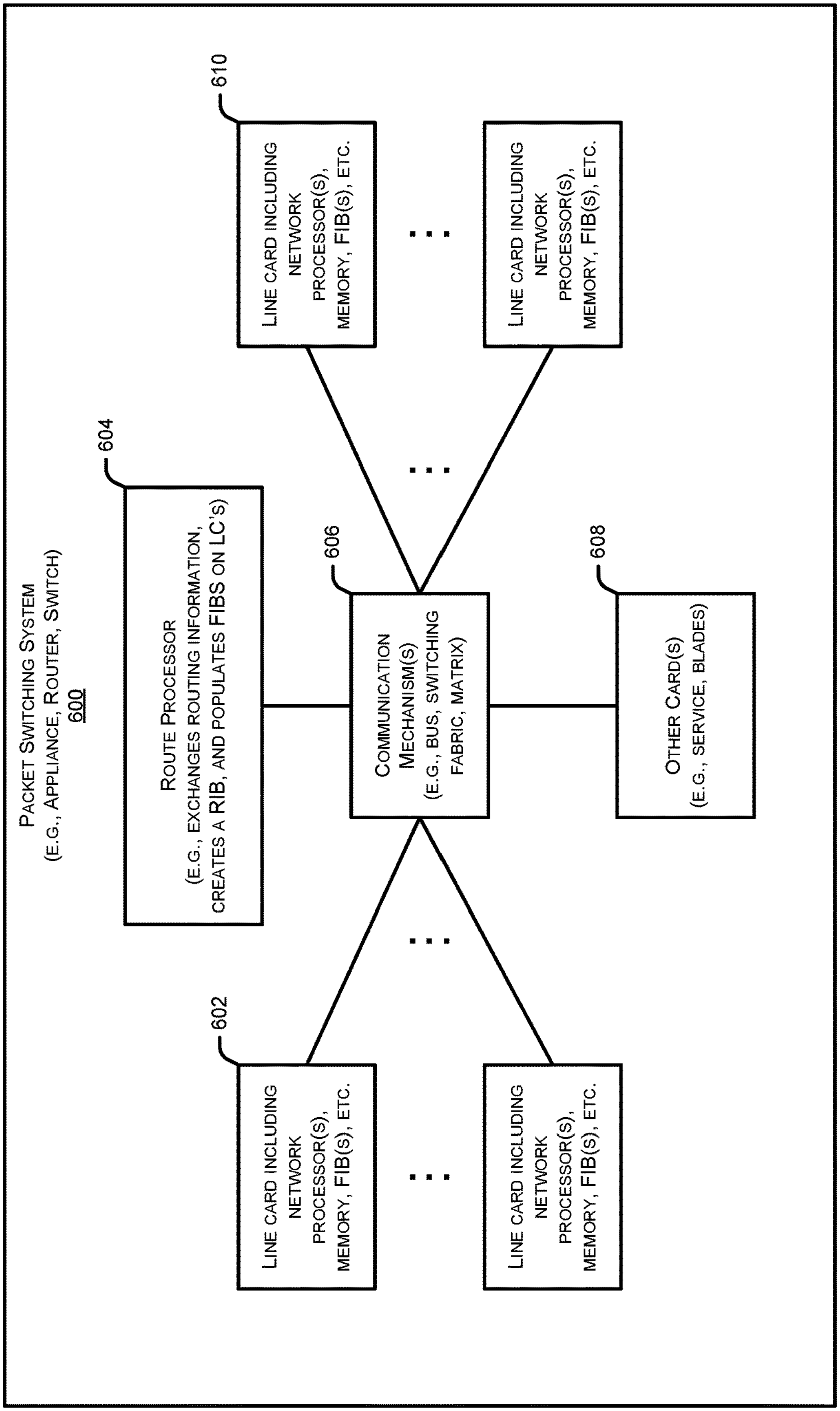
FIG. 6 illustrates a block diagram illustrating an example packet switching system that can be utilized to implement various aspects of the technologies disclosed herein.

FIG. 6 shows a block diagram illustrating an example packet switching device (or system) 600 that can be utilized to implement various aspects of the technologies disclosed herein. In some examples, packet switching device(s) 600 may be employed in various networks, such as, for example, network 114 as described with respect to FIGS. 1A and 1B. For instance, packet switching device 600 may be similar to a router 104.

In some examples, a packet switching device 600 may comprise multiple line card(s) 602, 610, each with one or more network interfaces for sending and receiving packets over communications links (e.g., possibly part of a link aggregation group). The packet switching device 600 may also have a control plane with one or more processing elements 604 for managing the control plane and/or control plane processing of packets associated with forwarding of packets in a network. The packet switching device 600 may also include other cards 608 (e.g., service cards, blades) which include processing elements that are used to process (e.g., forward/send, drop, manipulate, change, modify, receive, create, duplicate, apply a service) packets associated with forwarding of packets in a network. The packet switching device 600 may comprise hardware-based communication mechanism 606 (e.g., bus, switching fabric, and/or matrix, etc.) for allowing its different entities 602, 604, 608 and 610 to communicate. Line card(s) 602, 610 may typically perform the actions of being both an ingress and/or an egress line card 602, 610, in regard to multiple other particular packets and/or packet streams being received by, or sent from, packet switching device 600.

Figure 7:
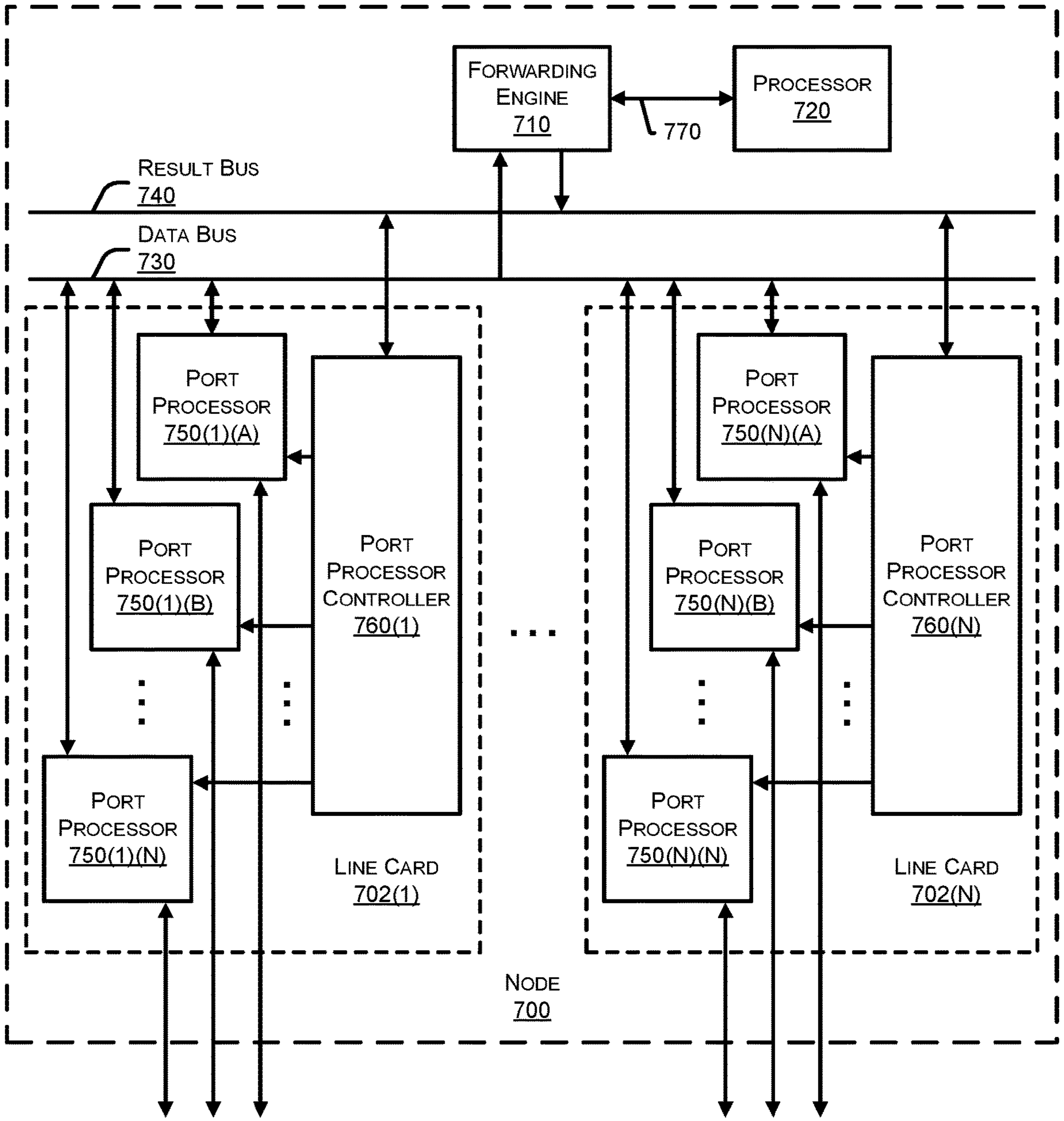
FIG. 7 illustrates a block diagram illustrating certain components of an example node that can be utilized to implement various aspects of the technologies disclosed herein.

FIG. 7 illustrates a block diagram illustrating certain components of an example node 500 that can be utilized to implement various aspects of the technologies disclosed herein. In some examples, node(s) 500 may be employed in various networks, such as, for example, network 1XX as described with respect to FIG. 1.

In some examples, node 700 may include any number of line cards 702 (e.g., line cards 702(1)-(N), where N may be any integer greater than 1) that are communicatively coupled to a forwarding engine 710 (also referred to as a packet forwarder) and/or a processor 720 via a data bus 730 and/or a result bus 740. Line cards 702(1)-(N) may include any number of port processors 750(1)(A)-(N)(N) which are controlled by port processor controllers 760(1)-(N), where N may be any integer greater than 1. Additionally, or alternatively, forwarding engine 710 and/or processor 720 are not only coupled to one another via the data bus 730 and the result bus 740, but may also communicatively coupled to one another by a communications link 770.

The processors (e.g., the port processor(s) 750 and/or the port processor controller(s) 760) of each line card 702 may be mounted on a single printed circuit board. When a packet or packet and header are received, the packet or packet and header may be identified and analyzed by node 700 (also referred to herein as a router) in the following manner. Upon receipt, a packet (or some or all of its control information) or packet and header may be sent from one of port processor(s) 750(1)(A)-(N)(N) at which the packet or packet and header was received and to one or more of those devices coupled to the data bus 730 (e.g., others of the port processor(s) 750(1)(A)-(N)(N), the forwarding engine 710 and/or the processor 720). Handling of the packet or packet and header may be determined, for example, by the forwarding engine 710. For example, the forwarding engine 710 may determine that the packet or packet and header should be forwarded to one or more of port processors 750(1)(A)-(N)(N). This may be accomplished by indicating to corresponding one(s) of port processor controllers 760(1)-(N) that the copy of the packet or packet and header held in the given one(s) of port processor(s) 750(1)(A)-(N)(N) should be forwarded to the appropriate one of port processor(s) 750(1)(A)-(N)(N). Additionally, or alternatively, once a packet or packet and header has been identified for processing, the forwarding engine 710, the processor 720, and/or the like may be used to process the packet or packet and header in some manner and/or maty add packet security information in order to secure the packet. On a node 700 sourcing such a packet or packet and header, this processing may include, for example, encryption of some or all of the packet's or packet and header's information, the addition of a digital signature, and/or some other information and/or processing capable of securing the packet or packet and header. On a node 700 receiving such a processed packet or packet and header, the corresponding process may be performed to recover or validate the packet's or packet and header's information that has been secured.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method performed by a network device, the method comprising:

receiving a domain name system (DNS) query from an Internet-of-Things (IOT) device via a logical connection between the IoT device and the network device in a network, the logical connection being on a secure side of the network device such that the IoT device is located within a secure area of the network, the DNS query sent via the logical connection to the network device and intended for delivery by the network device to a DNS service outside of the secure area;

verifying an identity of the IoT device;

determining that the IoT device is logically located within the secure area based at least in part on the network device receiving the DNS query via the logical connection from the secure side of the network device relative to the secure area;

responsive to determining that the IoT device is logically located within the secure area, producing digitally signed metadata, the digitally signed metadata including a location code indicating that the IoT device is within the secure area;

inserting the digitally signed metadata into the DNS query from the IoT device; and forwarding the DNS query with the digitally signed metadata outside the secure area to the DNS service.

2. The method of claim 1, wherein the IoT device is eDNS unaware.

3. The method of claim 1, wherein the network device that performs the method is a switch, router, or security device of the network.

4. The method of claim 1, wherein the secure area is bounded by a security boundary in the network, and the DNS service is logically located outside the security boundary relative to the IoT device.

5. The method of claim 1, wherein the location code includes information regarding positioning of the IoT device relative to a security barrier.

6. The method of claim 1, wherein the digitally signed metadata includes a flag indicating a presence of the digitally signed metadata.

7. A computer-implemented method comprising:

receiving, via an intercepting node, a domain name system (DNS) query from a querying device;

detecting metadata in the DNS query;

extracting the metadata from the DNS query;

verifying a signature of the metadata;

based at least in part on verifying the signature, extracting a location code from the metadata, the location code indicating a logical location of the querying device within a secure area of a network, the logical location determined by the intercepting node based at least in part on the intercepting node having received the DNS query from the querying device on a secure side of the intercepting node via a logical connection within the secure area;

comparing the logical location of the querying device to an expected location of the intercepting node; and based at least in part on the comparing, sending a response to the querying device.

8. The computer-implemented method of claim 7, wherein the logical location is within a security boundary.

9. The computer-implemented method of claim 7, wherein the location code indicates that the logical location of the querying device is in a logically secure position relative to a security barrier.

10. The computer-implemented method of claim 7, further comprising:

detecting a flag in the DNS query, the flag indicating a presence of metadata in the DNS query; and extracting the metadata from the DNS query at least partly responsive to detecting the flag.

11. The computer-implemented method of claim 7, wherein, in an instance where the location code matches the expected location, the response indicates that the DNS query is verified.

12. The computer-implemented method of claim 7, wherein, in an instance where the location code does not match the expected location, the response includes instructions for the querying device to shut down.

13. The computer-implemented method of claim 7, further comprising:

determining via the comparing that the location code does not match the expected location; and responsive to determining that the location code does not match the expected location, sending a message indicating a failed contextual validation to a management device.

14. A server device comprising:

one or more processors; and one or more non-transitory computer-readable media storing computer-executable instructions that, when executed by the one or more processors, cause the one or more processors to:

receive, via an intercepting node, a domain name system (DNS) query from a querying device;

detect metadata in the DNS query;

extract the metadata from the DNS query;

verify a signature of the metadata;

based at least in part on verifying the signature, extract a location code from the metadata, the location code indicating a logical location of the querying device within a secure area of a network, the logical location determined by the intercepting node based at least in part on the intercepting node having received the DNS query from the querying device on a secure side of the intercepting node via a logical connection within the secure area;

compare the logical location of the querying device to an expected location of the intercepting node; and based at least in part on the comparing, send a response to the querying device.

15. The server device of claim 14, wherein the logical location is within a security boundary.

16. The server device of claim 14, wherein the location code indicates that the logical location of the querying device is in a logically secure position relative to a security barrier.

17. The server device of claim 14, wherein the computer-executable instructions further cause the one or more processors to:

detect a flag in the DNS query, the flag indicating a presence of metadata in the DNS query; and extract the metadata from the DNS query at least partly responsive to detecting the flag.

18. The server device of claim 14, wherein, in an instance where the location code matches the expected location, the response indicates that the DNS query is verified.

19. The server device of claim 14, wherein, in an instance where the location code does not match the expected location, the response includes instructions for the querying device to shut down.

20. The server device of claim 14, wherein the computer-executable instructions further cause the one or more processors to:

determine that the location code does not match the expected location; and responsive to determining that the location code does not match the expected location, send a message indicating a failed contextual validation to a management device.

* * * * *